United States Patent [19]

Richards

[11] Patent Number: 4,826,343

[45] Date of Patent: May 2, 1989

[54] HARD METAL SCREW JOINT CONNECTION BETWEEN SOFT METAL MEMBERS

[76] Inventor: Peter S. Richards, 100 Mt. Si Pl. NW., Issaquah, Wash. 98027

[21] Appl. No.: 47,730

[22] Filed: May 6, 1987

[51] Int. Cl.$^4$ ............................................... F16B 7/08
[52] U.S. Cl. ................... 403/189; 403/245; 248/188; 108/156
[58] Field of Search ............... 403/189, 192, 245, 246, 403/264, 260; 248/188; 108/156

[56] References Cited

U.S. PATENT DOCUMENTS

| | | | |
|---|---|---|---|
| 1,884,491 | 10/1932 | Ziemann | 403/245 |
| 2,730,419 | 1/1956 | Watrous | 248/188 |
| 2,809,876 | 10/1957 | Huff | 248/188 |
| 3,506,227 | 4/1970 | Jenkins | 248/59 |
| 4,074,941 | 2/1978 | Jablonski | 403/260 |

FOREIGN PATENT DOCUMENTS 2011007  7/1979  United Kingdom ................ 403/258

*Primary Examiner*—Andrew V. Kundrat
*Attorney, Agent, or Firm*—Delbert J. Barnard

[57] ABSTRACT

Shank portions (32, 34) of a bolt (28) fit through an opening (22) in a base member (14). A bolt head (30) fits within a shallow socket (24) in a first side of the base member (14). The first side (18) of the base member (14) is placed against a support member (12) and is welded in place (16). The tubular end (48) of a post member (10) is moved endwise into an trepan groove (26) as the post (10) is rotated to first make and then tighten a screw connection (34, 40) between an insert (38) in the post member (10) and a threaded portion (34) of the bolt (28). The bolt (28) and insert (38) are made from a hard metal. The base member (14), the suppport member (12) and the post member (10) are constructed from a soft metal.

17 Claims, 2 Drawing Sheets

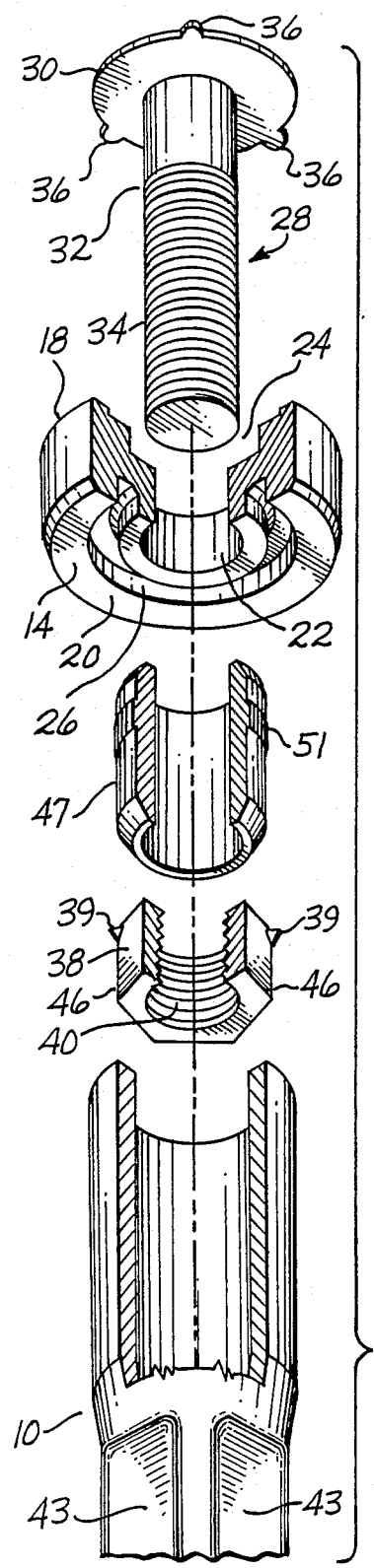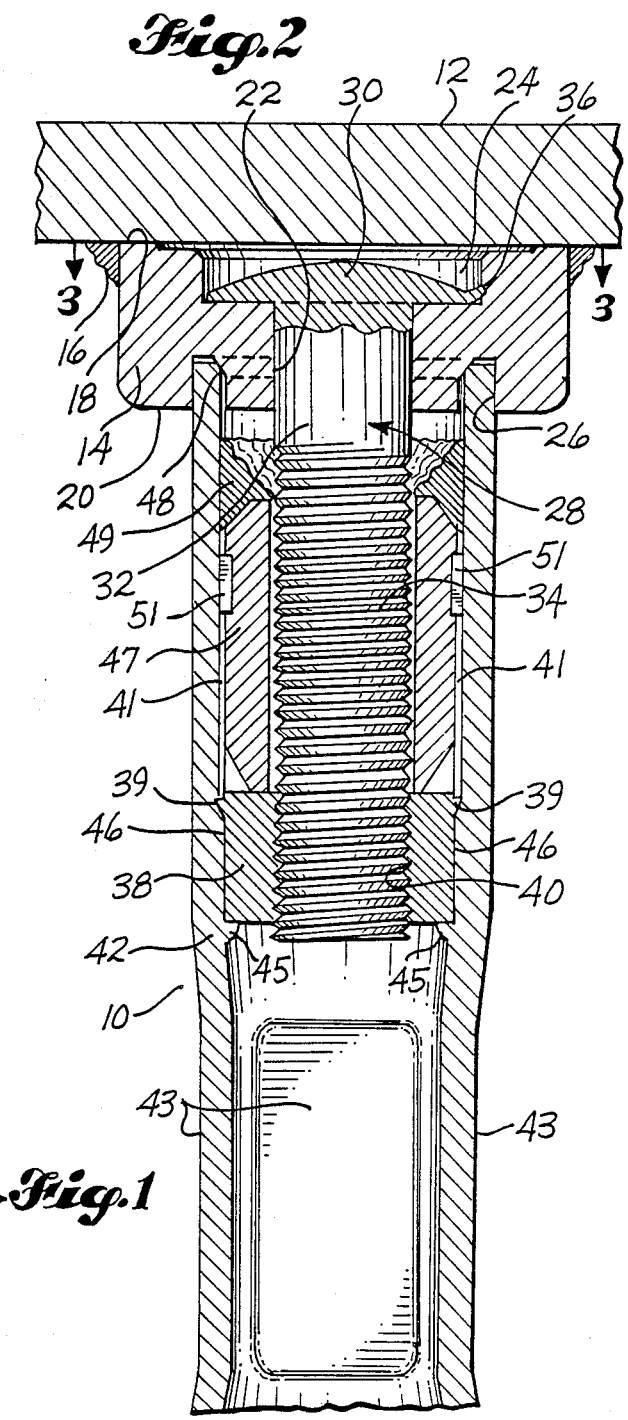

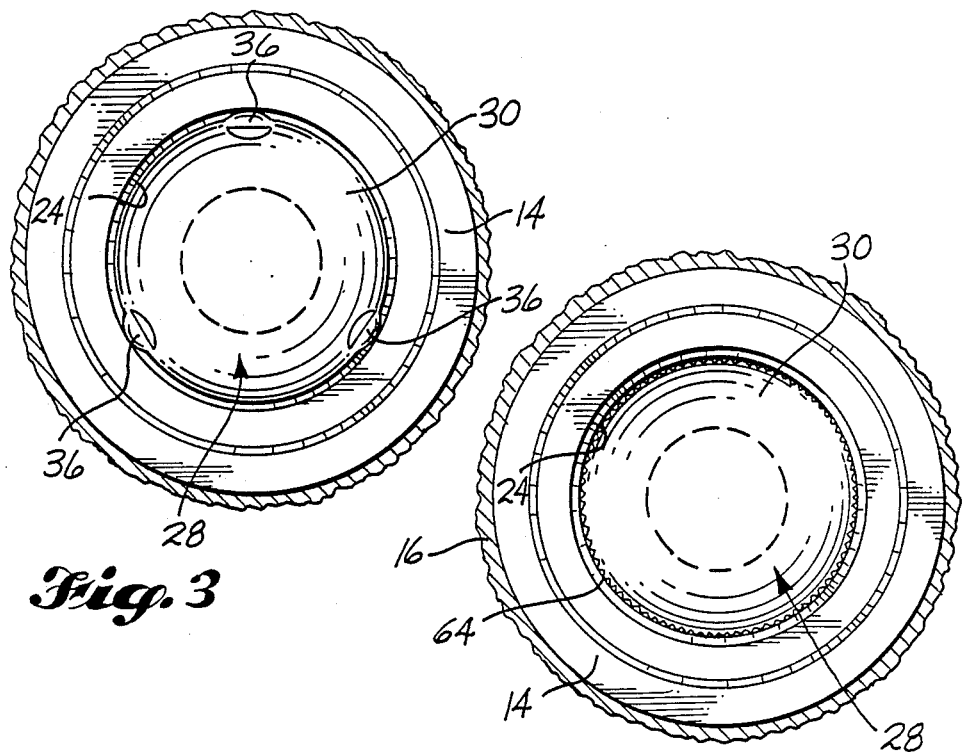
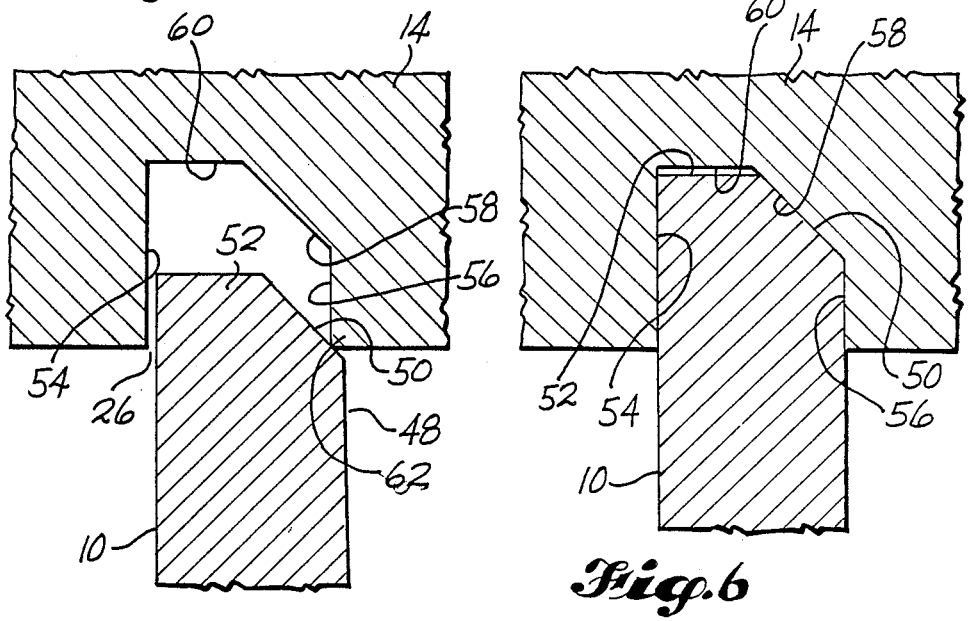

HARD METAL SCREW JOINT CONNECTION BETWEEN SOFT METAL MEMBERS

TECHNICAL FIELD

This invention relates to screw joints and in particular to the provision of a hard metal screw joint between two members which are constructed from soft metal.

BACKGROUND ART

The invention was made as a part of an effort to develop a support leg for a light fixture of the like which can be screw connected at its upper end to a ceiling or other overhead structure. It is known to weld such a support leg at its upper end to a ceiling structure and then weld a cross bar to the lower end of the support leg and then connect the lighting fixture to the cross bar. A problem with this type of construction is that if it becomes necessary to move the position of the light fixture for any reason, the support legs must be destructively removed.

It is generally known to provide a support leg which is connected by a screw joint to a stud which depends from a ceiling structure. An example of this type of arrangement is disclosed by U.S. Pat. No. 3,517,901, granted Apr. 14, 1970 to John C. Jenkins.

Some installations require the use of relatively soft metal materials, such as aluminum or aluminum alloys, for example. It is an object of the present invention to provide a joint construction between a soft metal post member and a support member which is laterally braced and includes a threaded connection between two hard metal members.

DESCRIPTION OF THE INVENTION

In accordance with the invention, a soft metal base member is provided of a type including a first side, a second side, and an opening extending between the first and second sides. A socket is formed in the first side and a trepan groove is formed in the second side, concentrically surrounding the opening. The shank of a hard metal bolt extends through the opening and the head of the bolt is located within the socket. The shank includes a threaded portion which projects beyond the second side of the base member. A soft metal post member is provided which has a tubular end sized to fit within the trepan groove. A hard metal insert is located within said post member. The insert has a central opening with threads constructed to make threaded engagement with the threads on the bolt. The insert is secured within the post member. After the bolt has been inserted into the base member the socket side of the base member is directed towards a support member and the base member is connected to the support member. The post member is then moved towards the base member to bring together an end of the threaded opening in the insert and the threaded end of the bolt, and align the tubular end of the post member with the annular groove. Then, the post member is rotated for the purpose of threading the insert onto the bolt. The post member is rotated until the screw joint is tight and the tubular end of the post member is tight within the trepan groove.

Preferably, the tubular end has a sloping end surface which serves to cam the tubular end into the trepan groove if such tubular end is off round. The threaded members are constructed from a hard metal which is not easily damaged by a joint tightening rotation. The fit of the tubular end into the trepan groove serves to laterally brace the joints so as to increase its ability to withstand sideloads applied on the post member away from the joint.

Other more detailed aspects of the invention, including ways of anchoring the hard metal bolt against rotation relative to the soft metal base member, and ways of retaining the hard metal insert within the soft metal post member, are hereinafter described as a part of the description of the best mode of the invention. Thus, with respect to the various details that are claimed, the description of the best mode also constitutes a portion of the description of the invention.

These and other features, advantages and characteristics of the invention will all be apparent from the various embodiments of the invention which are illustrated and described below in connection with the drawing.

BRIEF DESCRIPTION OF THE DRAWING

Like reference numerals are used to designate like parts throughout the several views of the drawing, and:

FIG. 1 is an exploded isometric view of the joint construction of the invention;

FIG. 2 is an axial sectional view of the joint construction in an assembled condition, with some parts being shown in elevation;

FIG. 3 is a cross-sectional view taken substantially along line 3—3 of FIG. 2;

FIG. 4 is a view like FIG. 3, but showing a modified construction of the bolt head.

FIG. 5 is an enlarged scale view of a fragment of the tubular end of the support post making an off line entry into the annular groove in the base member; and FIG. 6 is a view like FIG. 5 but showing the tubular end inside the trepan groove.

BEST MODE FOR CARRYING OUT THE INVENTION

FIGS. 1 and 2 show an upper end portion of a post member 10. The post member 10 may serve to connect a light fixture or other object to a support member 12 which may be a part of a ceiling. The configuration of the post member 10 below its upper end portion is not important to this invention and for that reason it has not been illustrated.

Member 12 is made from a relatively soft metal, such as aluminum or an aluminum alloy, for example. Post member 10 is made from the same or a similar soft metal material. In accordance with the invention, a soft metal base member 14 is provided which is welded to the support member 12. By way of example, member 14 is shown to be circular in form and is connected to support member 12 by a weld bead 16 which extends around the upper periphery of the base member 14.

Base member 14 has a first side 18, shown in the illustrated embodiment to be directed upwardly, and a second side 20, shown in such embodiment to be directed downwardly. An opening 22 extends through base member 14 between the first and second sides 18, 20. A shallow socket 24 is formed within the first side 18. An trepan groove 26 is formed within the second side 20. Trepan groove 26 concentrically surrounds the opening 22. Socket 24 is also concentric with the opening 22.

A hard metal bolt 28 is provided. It includes a head 30 sized to fit within the socket 24 and a shank 32 which extends through the opening 22. Shank 32 includes a threaded portion 34 which projects beyond the second side 20 of member 14.

By way of typical and therefore nonlimitive example, bolt 28 is constructed from stainless steel. It is formed to include anchor means for securing its head 30 within the socket 24 in a manner resisting rotation of the bolt 28 relative to the base member 14. In the preferred embodiment, the anchor means are in the form of projections 36 that have formed by a deformation of the metal to cause metal movement radially outwardly from the periphery of the bolt head. The metal at the periphery of the bolt head 30 is pinched so as to cause it to thin out and move radially outwardly. Preferably, the thinning is done in a manner forming a cutting edge at the outer end of each projection 36. The socket 24 is sized to snugly receive the normal diameter of the head 30. When the bolt is inserted through the opening 22 and moves endwise to place the head 30 within the socket 24, it becomes necessary to force the head 30 into the socket. This forcing causes the projections 36 to cut into the sidewall of the socket 24. The projections 36 then serve to anchor the bolt 28 so that it will not rotate relative to the member 14 in response to torque loading imposed on the bolt 26 when the post member 10 is installed, in a manner to be described later. The projections 36 also prevent the bolt 26 from being pushed out of the member 14 once installed in it.

Preferably, post 10 is reduced in diameter starting at location 42 and continuing to a pattern of wrench flats 43. In accordance with the invention, a hard metal insert 38 is fixed in position within the upper end portion of post member 10. Insert 38 may be a nut as illustrated. It includes a threaded opening 40 which extends through it, from one end to the other. The threads 40 complement the threads on the bolt shank 34. The trailing corner portions of insert 38 are deformed to create lateral projections 39. The insert 38 is placed into the upper end of the post member 10 and pushed downwardly. The projections 39 cut longitudinal grooves 41 in the inner surface of tubular wall 10 as insert 38 moves downwardly. The insert 38 is moved downwardly until its leading corner point 46 moves into the sidewall material of the reduced diameter region of member 10, displacing regions of metal 45. This forms a structural interlock between the insert 38 and the post member 10, functioning to resist both rotation and downward movement of the insert 38 relative to the post member 10. The interfit of the projections 39 into the sidewall material of post 10 also resists rotation of insert 38 relative to post 10.

The insert 38 may be anchored in place endwise by inserting into post 10, above insert 38, a sleeve 47 of a material that is weldable to post member 10. The weld bead 49 becomes an integral part of the sidewall of the tubing 10 and forms an end stop of the insert 38 and the sleeve 47, preventing them from moving endwise upwardly.

Post member 10 includes a tubular end portion 48 which is sized to be received within the trepan groove 26.

As shown in FIG. 2, the hard metal bolt 28 is inserted into base member 14 and then base member 14 is secured to support member 12, such as by a weld bead 16. The base member 14 thus serves to connect the hard metal bolt 28 to the soft metal support member 12, so that its shank portion 32, 34 depends from base member 14 and support member 12. As explained above, the anchor means at the periphery of that boat head 30 anchors the bolt 28 against rotation relative to either the base member 14 or the support member 12.

FIG. 4 shows a modification of the anchor means at the periphery of the bolt head 30. In this embodiment the periphery is serrated so that peeks and valleys are formed by serrations 64 which preferably extend about the entire periphery of the bolt head 30. These serrations dig into the sidewall of the socket 24, and hold the bolt 28 against rotation relative to the base member 14.

The joint is made by a workman carrying the post member 10 to the location of the bolt 28 and moving its tubular end 48 upwardly to start the threads 34 on the bolt 28 into the threads 40 in the insert 38. Then, the post member 10 is rotated for the purpose of screwing the parts together. As the insert 38 travels along the threads 34 on the bolt 28, the tubular end 48 of post member 10 moves into the trepan groove 26. Rotation is continued until the tubular end 48 is tight within the groove 26.

Preferably, the tubular end 48 is chamferred to provide a beveled surface that is directed towards the trepan groove 26. In the illustrated embodiment the beveled surface 50 is formed adjacent the inside surface of tubular end 48. It and a substantially squared end surface 52 form the end of tubular end 48. In similar fashion, the trepan groove 26 includes a pair of sidewalls 54, 56, and an endwall having a slanting portion 58 and a substantially squared portion 60. The slanting portion 58 makes a slanting angle with the sidewall 56.

The most important reason for use of a beveled surface 58 at the inside corner of the trepan 26, and a beveled surface 50 at the inner diameter of the tubular member 10, is for the purpose of mechanically camming the tube 10 radially outwardly into tight contact with the outside diameter 54 of the trepan 26. In preferred form, beveled surface 58 is constructed to be wider (or deeper) than beveled surface 50. This will cause a radially outward displacement on member 10 as surfaces 50, 58 are moved together during tightening of the screw joint. The mating surfaces 50, 58 cause an expansion of the tube 10, increasing its outside diameter until no clearance exists between it and the sidewall 54. This elimination of all clearances between tube 10 and wall 54 also eliminates a space in which part 10 could move in response to vibration forces. A live clamp force is developed between the outer diameter of tube 10 and wall 54 which functions to resist the effects of shock loads and vibration forces.

There is a variance in both inside and outside diameter of tubing made from soft materials such as aluminum alloys. Also, the tubing is not exactly circular or "round" and the amount that it is off "round" varies from each piece of tubing to the next. FIG. 5 shows a situation which could exist if the tubular end 48 is off round. As shown by FIGS. 5 and 6, the beveled surface 50 serves to cam the tubular end 48 into the trepan groove 26. The tubular end does not enter directly into the trepan groove 26. Rather, its beveled surface 50 first makes contact with a corner 62. This contact between surface 50 and corner 62 causes the tubular end 48 to be directed into the trepan groove 26 as the post member 10 is being rotated. The metal used for member 10 is soft enough that it will deform as needed so that as the post member 10 is rotated the tubular end 48 will move into and fill the trepan groove 26. FIG. 6 shows the end surfaces 50, 52 of the tubular end 48 bottoming against the end surfaces 58, 60 of the base member 14.

The tight fit of the tubular end 48 within the trepan groove 26 serves to brace the post member 10 against sideways movement at its upper end in response to sideways forces applied against the post member 10 at a location spaced from support member 12.

As will be appreciated, numerous changes can be made in the specific details of the joint construction without departing from the basic principles of the invention. For example, the beveled surface 50 and the slanting surface 58 can be moved to the radially outer sides of the tubular end 48 and trepan groove 26, respectively. The insert can be different in form and anchored differently. Likewise, the anchor means used for anchoring the bolt 28 against rotation relative to a base member 14 can vary.

The terms "hard metal" and "soft metal" are relative terms but a person skilled in the art will know what is meant by these terms. A screw joint between hard metal components is desired and the problem addressed by the invention is to provide a screw joint between members constructed from soft metal. Accordingly, the term "hard metal" is used to refer to a metal that can provide a superior screw joint to the second type of metal used which is referred to as "soft metal."

The mechanical joint of the invention eliminates the problem experienced by welded aluminum joints losing strength because of the welding heat removing a temper state from the support post. The use of the mechanical joints allows an aluminum support arm to be affixed to a stainless steel or carbon steel structure.

An aluminum support post 10 is processed in the following manner. Firstly, the material is received in a hardened condition, as a length of tubing. The tubing is cut to provide a support post 10 of the desired length. Next, the cut post 10 is anneal to soften it. It is shaped to form the wrench flats 33. Next the nut 38 is press fit into the tube 10. The trailing corners of the peaks 46 may be pinched to form radially outwardly extending projections 47 (like members 36 in FIG. 3). The tube 10 is gripped at the wrench flats 33 to hold it in position. Nut 38 is then pushed into the end of the tube until it seats against the box section. As the nut 38 travels inwardly the projections 47 deform grooves in the tubing 10. The interfit of the projections 47 in these grooves resists relative rotation between nut 38 and tube 10. Then, the aluminum member 49 is installed. Preferably, both ends of the aluminum member 49 are beveled as illustrated. The bevel at the leading end makes it easier to guide the member 49 into the tube 10. The fit of member 49 in the tube 10 is preferably an interference fit. The member 49 is constructed to include outstanding longitudinal splines. These splines deform their way into the tube material. Next the member 49 is welded to the tube 10. The bevel at the opposite end receives some of the fillet weld used to secure member 49 in place. Next, the member 10 is heat treated back up to a full hard condition. Then the end of the tube 10 is dressed, including by forming the forty-five degree (45°) bevel at its inside diameter. The weld is dressed, if necessary, to prevent any interference between it and member 14.

It is to be understood that the illustrated embodiments are presented for examples only. The scope of the invention is not to be determined by the illustrated embodiments but rather by the appended claims, interpreted in accordance with established rules of patent claim interpretation, including use of the doctrine of equivalents.

What is claimed is:

1. A joint construction, comprising:
   a support member;
   a soft metal base member including a first side, a second side, an opening extending between said first and second sides, a socket in said first side, and a trepan groove in said second side concentrically surrounding said opening;
   a hard metal bolt having a head located within said socket and a shank extending from said head through said opening, said shank including a threaded portion which projects beyond the second side of said base member;
   a soft metal post member having a tubular end sized to fit within said trepan groove;
   a hard metal insert located within said post member, said insert having a central opening with threads constructed to make threaded engagement with the threads on said bolt;
   means securing said insert within said post member; and
   means connecting the base member to said support member with the first side of said member directed towards said support member;
   wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove.

2. A joint construction comprising:
   a support member;
   a soft metal base member including a first side, a second side, an opening extending between said first and second sides, a socket in said first side, and a trepan groove in said second side concentrically surrounding said opening;
   a hard metal bolt having a head located within said socket and a shank extending from said head through said opening, said shank including a threaded portion which projects beyond the second side of said base member;
   a soft metal post member having a tubular end sized to fit within said trepan groove;
   a hard metal insert located within said post member, said insert having a central opening with threads constructed to make threaded engagement with the threads on said bolt;
   means securing said insert within said post member; and
   means connecting the base member to said support member with the first side of said member directed towards said support member;
   wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove; and
   wherein the trepan groove in the base member includes a pair of sidewalls and an endwall extending between the sidewalls, with at least a portion of said endwall making a slanting angle with one of the sidewalls and wherein the tubular end of the post member includes a beveled edge which makes contact with the slanting surface of the trepan groove.

3. A joint constructed according to claim 2, wherein the end surface of the trepan groove includes a substantially squared portion and the tubular end of the post member includes a substantially squared portion, wherein when the tubular end of the post member is placed within the trepan groove the beveled surface on the tubular end of the post member mates with the slanting surface of the trepan groove and the substantially squared end surface of the tubular end of the post member mates with the substantially squared portion of the end surface of the trepan groove.

4. A joint constructed according to claim 1, wherein the post member includes a reduced diameter portion axially inwardly of the post member from the insert and such reduced diameter portion prevents axial inward movement of the insert, and means is provided at the opposite end of the insert to prevent its movement out from the post member.

5. A joint construction according to claim 2, wherein the post member includes a reduced diameter portion axially inwardly of the post member from the insert and such reduced diameter portion prevents axial inward movement of the insert, and means is provided at the opposite end of the insert to prevent its movement out from the post member.

6. A joint construction according to claim 3, wherein the post member includes a reduced diameter portion axially inwardly of the post member from the insert and such reduced diameter portion prevents axial inward movement of the insert, and means is provided at the opposite end of the insert to prevent its movement out from the post member.

7. A joint construction according to claim 1, wherein the head of the bolt includes anchor means which digs into the base member where it borders the socket when the bolt is inserted through the opening and the head of the bolt is positioned within said socket, to hold the bolt against turning relative to the base member, and extraction-expulsion prior to installation.

8. A joint construction comprising:
 a support member;
 a soft metal base member including a first side, a second side, an opening extending between said first and second sides, a socket in said first side, and a trepan groove in said second side concentrically surrounding said opening;
 a hard metal bolt having a head located within said socket and a shank extending from said head through said opening, said shank including a threaded portion which projects beyond the second side of said base member;
 a soft metal post member having a tubular end sized to fit within said trepan groove;
 a hard metal insert located within said post member, said insert having a central opening with threads constructed to make threaded engagement with the threads on said bolt;
 means securing said insert within said post member; and
 means connecting the base member to said support member with the first side of said member directed towards said support member;
 wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove;
 wherein the head of the bolt includes anchor means which digs into the base member where it borders the socket when the bolt is inserted through the opening and the head of the bolt is positioned within said socket, to hold the bolt against turning relative to the base member, and extraction-expulsion prior to installation; and
 wherein said anchor means comprises at least one projection at the periphery of the head of the bolt formed by a deformation of the head of the bolt to cause metal movement radially outwardly from the periphery of the bolt head to form the projection.

9. A joint construction according to claim 7, wherein said anchor means comprises serrations at the periphery of the bolt head positioned to dig into the base member where it surrounds the socket when the bolt is being joined to the base member and the head of the bolt is being moved into the socket.

10. A joint construction according to claim 2, wherein the head of the bolt includes anchor means which digs into the base member where it borders the socket when the bolt is inserted through the opening and the head of the bolt is positioned within said socket, to hold the bolt against turning relative to the base member, and extraction-expulsion prior to installation.

11. A joint construction according to claim 3, wherein the head of the bolt includes anchor means which digs into the base member where it borders the socket when the bolt is inserted through the opening and the head of the bolt is positioned within said socket, to hold the bolt against turning relative to the base member, and extraction-expulsion prior to installation.

12. A joint construction according to claim 4, wherein the head of the bolt includes anchor means which digs into the space member where it borders the socket when the bolt is inserted through the opening and the head of the bolt is positioned within said socket, to hold the bolt against turning relative to the base member, and extraction-expulsion prior to installation.

13. A joint construction according to claim 1, wherein said insert includes an outer sidewall presenting a pattern of anchor elements to the post member and axially inwardly of the insert the post member is reduced in diameter, and the insert is forceably moved axially into the reduced diameter portion so that the means at its periphery digs into the post material to inerlock with the insert and hold the insert against both rotation and inward axial movement relative to the post member.

14. A joint construction comprising:
 a support member;
 a soft metal base member including a first side, a second side, an opening extending between said first and second sides, a socket in said first side, and a trepan groove in said second side concentrically surrounding said opening;
 a hard metal bolt having a head located within said socket and a shank extending from said head through said opening, said shank including a threaded portion which projects beyond the second side of said base member;

a soft metal post member having a tubular end sized to fit within said trepan groove;

a hard metal insert located within said post member, said insert having a central opening with threads constructed to make threaded engagement with the threads on said bolt;

means securing said insert within said post member; and means connecting the base member to said support member with the first side of said member directed towards said support member;

wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove;

wherein said insert includes an outer sidewall presenting a pattern of anchor elements to the post member and axially inwardly of the insert the post member is reduced in diameter, and the insert is forceably moved axially into the reduced diameter portion so that the means at its periphery digs into the post material to interlock with the insert and hold the insert against both rotation and inward axial movement relative to the post member; and a sleeve in the post member axially outwardly of the insert, said sleeve being constructed from a material that can be welded to the post member, and a weld bead at tjhe outer end of the sleeve member, connecting the sleeve member to the post member.

15. A joint construction according to claim 13, wherein the head of the bolt includes anchor means which digs into the base member where it borders the socket when the bolt is inserted through the opening and the head of the bolt is positioned within said socket, to hold the bolt against turning relative to the base member.

16. A joint construction according to claim 14, wherein the head of the bolt includes anchor means which digs into the base member where it borders the socket when the bolt is inserted through the opening and the head of the bot is positioned within said socket, to hold the bolt against turning relative to the base member.

17. A joint construction comprising:

a support member;

a soft metal base member including a first side, a second side, an opening extending between said first and second sides, a socket in said first side, and a trepan groove in said second side concentrically surrounding said opening;

a hard metal bolt having a head located within said socket and a shank extending from said head through said opening, said shank including a threaded portion which projects beyond the second side of said base member;

a soft metal post member having a tubular end sized to fit within said trepan groove;

a hard metal insert located within said post member, said insert having a central opening with threads constructed to make threaded engagement with the threads on said bolt;

means securing said insert within said post member; and means connecting the base member to said support member with the first side of said member directed towards said support member;

wherein in use the post member is moved towards the base member and its tubular end is placed within said trepan groove and the threads of the bolt are mated with the threads in the insert, and then the post member is rotated for the purpose of making a threaded connection between the bolt and the insert and tightening such connection until the tubular end of the post member is tight within said trepan groove;

wherein said insert includes an outer sidewall presenting a pattern of anchor elements to the post member and axially inwardly of the insert the post member is reduced in dimeter, and the insert is forceably moved axially into the reduced diameter portion so that the means at its periphery digs into the post material to interlock with the insert and hold the insert against both rotation and inward axial movement relative to the post member; and wherein the trepan groove in the base member includes a pair of sidewalls and an endwall extending between the sidewall, with at least a portion of said endwall making a slanting angle with one of the sidewalls and wherein the tubular end of the post member includes a beveled edge which makes contact with the slanting end surface of the trepan groove.

* * * * *